United States Patent [19]

Nelson, Jr. et al.

[11] Patent Number: 4,516,981

[45] Date of Patent: May 14, 1985

[54] RESIDUAL OIL SLUDGE DISPERSANT

[76] Inventors: Otis L. Nelson, Jr.; Mark L. Nelson, both of 2543 So. Two Mile Rd., Bay City, Mich. 48706

[21] Appl. No.: 569,160

[22] Filed: Jan. 9, 1984

[51] Int. Cl.$^3$ ............................................. C10L 1/18
[52] U.S. Cl. ........................................ 44/53; 44/51; 44/77; 44/78; 252/351
[58] Field of Search ................ 44/53, 51, 77, 78; 585/14; 252/351, DIG. 1; 210/925

[56] References Cited

U.S. PATENT DOCUMENTS

| | | | |
|---|---|---|---|
| 2,170,644 | 8/1939 | Nelson | 252/351 |
| 3,282,843 | 11/1966 | Alburger | 252/351 |
| 3,577,340 | 5/1971 | Paviak et al. | 252/351 |
| 3,917,537 | 11/1975 | Elsdon | 44/58 |

*Primary Examiner*—William R. Dixon, Jr.
*Assistant Examiner*—Margaret B. Medley
*Attorney, Agent, or Firm*—Lackenbach, Siegel, Marzullo, Presta & Aronson

[57] ABSTRACT

A non-ionic composition for dispersing sludge and causing rapid separation of water for easy removal, in residual oils is formed from a blend of N-hexanol, diethylene glycol methyl ether and isooctyl phenyl polyethoxy ethanol. The dispersant, when used in 1:1,000–4,000 parts of dispersant to parts of oil, causes dispersion of the sludge and eliminates the need for physically removing the sludge.

13 Claims, No Drawings

4,516,981

RESIDUAL OIL SLUDGE DISPERSANT

FIELD OF THE INVENTION

This invention relates to a sludge dispersant. More specifically, this invention relates to a sludge dispersant for residual fuel oils.

BACKGROUND AND DISCUSSION OF THE PRIOR ART

Heavy residual oils such as no. 6 residual are stored in large holding tanks. Often such oils contain portions of tars, carbon and exceptionally heavy portions which eventually settle out in storage. With accumulation of the settled sludge, the storage tank has to be taken out of service and cleaned, with concommitant loss of time and fuel.

Another storage problem is water condensation and accumulation, which can lead to bacteria formation and fuel deterioration, as well as freezing, depending upon the ambient environment.

Prior art attempts have been directed to solving certain of these problems, with only limited success.

Now there is provided by the present invention a dispersant which disperses the sludge and causes rapid settling out of dispersed water for easy removal.

SUMMARY OF THE INVENTION

A non-ionic dispersant which disperses sludge and precipitates unwanted water in residual oils formed of a blend of an alcohol such as hexanol, glycol alkyl ether, and a polyethoxylated compound.

DESCRIPTION OF THE PREFERRED EMBODIMENTS

Broadly speaking, the composition of the present invention is as follows:

| Component | Weight Percent Preferred | Useful |
| --- | --- | --- |
| hexanol | 20–30 | 10–50 |
| glycol ether | 10–20 | 5–50 |
| polyethoxylated compound | 50–75 | 25–80 |

The hexanol may be a mixture of the hexanol isomers or may be N-hexanol, neat. Other low molecular weight alkyl alcohols may be somewhat useful, but hexanol is most preferred.

Suitable glycol ethers include glycol alkyl ethers, particularly dimethylene glycol methyl ether, ethylene glycol ethyl ether, tri-ethylene glycol methyl ether, and the like. Dimethylene glycol methyl ether is most preferred.

Suitable polyethoxylated compounds useful pursuant to the present invention are aryl polyethoxylated compounds, and specifically the alkyl aryl polyethoxylated compounds, and more specifically the alcohol forms thereof. Suitable alkyl components are $C_2$–$C_{10}$, and suitable aryl components include benzyl, phenyl, naphthyl and the like. Isooctyl phenyl polyethoxy ethanol is most preferred.

The following examples are illustrative of the invention:

| Component | Weight % |
| --- | --- |
| hexanol[1] | 25 |
| diethylene glycol methyl ether | 15 |
| isooctyl phenyl polyethoxy ethanol[2] | 60 |

[1] EPAL 6 (Ethyl Corp., Baton Rouge, La.)
[2] TRITON X-100 (Rohm & Haas, Philadelphia, Pa.)

Hexanol and glycol ether are mixed at room temperature for about 5 minutes. The polyethoxy ether is then added at room temperature and mixed for 15–20 minutes.

When the aforesaid composition is added in 1:1,000 to 4,000 parts of dispersant to parts of oil, the sludge is readily dispersed.

A sludge of no. 6 heavy oil containing 30% seawater was divided in three equal aliquot portions, designated samples no. 1–3. Sample 1 was blank, that is, no additive added. Sample 2 was provided with 1 part of diethylene glycol methyl ether to 1,000 parts of the sample. Sample 3 contained 1 part of the aforesaid sludge dispersant of the present invention to 1,000 parts of the sample. All samples were heated to 170° F. and allowed to sit for 21 hours.

The only sample which gave the desired results of dispersing sludge and precipitating water for easy removal was sample 3, which is the invention.

What is claimed is:

1. A residual oil sludge dispersant comprising a low molecular weight alkyl alcohol; a glycol ether; and a polyethoxylated compound, said alcohol being present in an amount of 20–30 percent by weight, said glycol ether comprising a glycol alkyl ether present in an amount of 10–20 percent by weight, and said ethoxylated compound being present in an amount of 50–75 percent by weight.

2. The dispersant of claim 1, wherein the alcohol is hexanol.

3. The dispersant of claim 2, wherein the alcohol is n-hexanol.

4. The dispersant of claim 1, wherein the glycol ether is a glycol alkyl ether.

5. The dispersant of claim 4, wherein the glycol alkyl ether is diethylene glycol methyl ether.

6. The dispersant of claim 1, wherein the polyethoxylated compound is isooctyl phenyl polyethoxy ethanol.

7. The dispersant of claim 1, wherein the dispersant is added to a residual oil in an amount of from 1 part of dispersant to 1,000–4,000 parts of oil.

8. The dispersant of claim 1, said polyethoxylated compound being an alkyl aryl polyethoxylated compound.

9. A residual oil sludge dispersant comprising:

| | Weight % |
| --- | --- |
| hexanol | 25 |
| diethylene glycol methyl ether | 15 |
| isooctyl phenyl polyethoxy ethanol | 60 |

10. In combination;
a residual oil having sludge and water; and a dispersant 1 part of dispersant to 1,000–4,000 parts of oil consisting essentially of a low molecular weight alcohol 20–30 percent by weight, a glycol ether 10-20 percent by weight, and a polyethoxylated compound 50-70 percent by weight, wherein the dispersant disperses sludge and precipitates out water from the residual oil.

11. The combination of claim 10, said alcohol comprising hexanol; said glycol ether comprising diethylene glycol methyl ether, said polyethoxylated compound comprising isooctyl phenyl polyethoxy ethanol.

12. A method of removing water from residual oil, which comprises adding to such residual oil the additive according to claim 1 and removing water precipitated therefrom.

13. The method according to claim 12, wherein said additive is added in an effective amount of from 1 part of said additive per 1,000 to 4,000 parts of said residual oil.

* * * * *